United States Patent
Raettich et al.

(10) Patent No.: US 11,870,093 B2
(45) Date of Patent: Jan. 9, 2024

(54) VEHICLE WITH A HIGH-VOLTAGE BATTERY

(71) Applicant: Bayerische Motoren Werke Aktiengesellschaft, Munich (DE)

(72) Inventors: Philip Raettich, Bidingen (DE); Frank Tenfelde, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/052,246

(22) PCT Filed: May 2, 2019

(86) PCT No.: PCT/EP2019/061260
§ 371 (c)(1),
(2) Date: Nov. 2, 2020

(87) PCT Pub. No.: WO2019/242923
PCT Pub. Date: Dec. 26, 2019

(65) Prior Publication Data
US 2021/0367307 A1 Nov. 25, 2021

(30) Foreign Application Priority Data
Jun. 21, 2018 (DE) ...................... 10 2018 210 152.3

(51) Int. Cl.
*H01M 50/342* (2021.01)
*H01M 50/204* (2021.01)
(Continued)

(52) U.S. Cl.
CPC ........... *H01M 50/342* (2021.01); *B60L 50/64* (2019.02); *H01M 10/658* (2015.04);
(Continued)

(58) Field of Classification Search
CPC ... Y02E 60/10; H01M 2220/20; H01M 50/30; H01M 50/342; H01M 50/124;
(Continued)

(56) References Cited

U.S. PATENT DOCUMENTS

| 5,206,088 A | 4/1993 | Raevsky | |
| 2003/0158314 A1* | 8/2003 | Abu-Isa | C08K 3/01 524/495 |

(Continued)

FOREIGN PATENT DOCUMENTS

| CN | 101262048 A | 9/2008 |
| CN | 101523636 A | 9/2009 |

(Continued)

OTHER PUBLICATIONS

Machine translation of specification of JP2012113896A (Year: 2012).*

(Continued)

*Primary Examiner* — Kiran Quraishi Akhtar
(74) *Attorney, Agent, or Firm* — Crowell & Morning LLP

(57) ABSTRACT

A vehicle includes a high-voltage battery that has a housing and at least one battery cell arranged in the housing. The battery cell has a battery cell housing with an emergency degassing opening which opens at a specified cell inner pressure and through which hot or burning gas can pass out of the interior of the battery cell housing into the housing of the high-voltage battery in the event of a disruption or damage to the battery cell. The emergency degassing opening faces a housing wall against which hot or burning gas flows in the event of the disruption or damage to the battery cell. The housing wall of the high-voltage battery is designed to be more thermally resistant locally in the region in which the emergency degassing opening is arranged and in which the hot or burning gas flows out of the battery cell (Continued)

housing in the event of a disruption or damage to the battery cell than in the wall regions at a distance from the emergency degassing opening.

15 Claims, 1 Drawing Sheet

(51) Int. Cl.
　　　*H01M 50/147*　　(2021.01)
　　　*H01M 50/249*　　(2021.01)
　　　*B60L 50/64*　　(2019.01)
　　　*H01M 10/658*　　(2014.01)
　　　*H01M 50/227*　　(2021.01)
　　　*H01M 50/224*　　(2021.01)
(52) U.S. Cl.
　　　CPC ....... *H01M 50/147* (2021.01); *H01M 50/204* (2021.01); *H01M 50/224* (2021.01); *H01M 50/227* (2021.01); *H01M 50/249* (2021.01); *H01M 2200/10* (2013.01); *H01M 2200/20* (2013.01); *H01M 2220/20* (2013.01)
(58) Field of Classification Search
　　　CPC .......... H01M 50/1243; H01M 50/147; H01M 50/204; H01M 2200/10; H01M 2200/20; H01M 10/658; H01M 50/3425; H01M 50/224; H01M 50/227; H01M 50/249; H01M 50/20; Y02T 10/70; Y02P 70/50; B60L 50/64
　　　See application file for complete search history.

(56) References Cited

U.S. PATENT DOCUMENTS

| | | | |
|---|---|---|---|
| 2008/0220320 | A1 | 9/2008 | Horikoshi et al. |
| 2008/0241660 | A1 | 10/2008 | Ogawa et al. |
| 2011/0177366 | A1 | 7/2011 | Nagasaki et al. |
| 2011/0195284 | A1 | 8/2011 | Yasui et al. |
| 2011/0200856 | A1 | 8/2011 | Yasui et al. |
| 2011/0274951 | A1 | 11/2011 | Yasui et al. |
| 2012/0263982 | A1 | 10/2012 | Yasui et al. |
| 2012/0263995 | A1 | 10/2012 | Naito et al. |
| 2013/0004813 | A1 | 1/2013 | Kim |
| 2013/0095355 | A1 | 4/2013 | Okutani et al. |
| 2013/0095356 | A1 | 4/2013 | Shimizu et al. |
| 2013/0183544 | A1 | 7/2013 | Yoshioka et al. |
| 2014/0162093 | A1 | 6/2014 | Reitzle et al. |
| 2014/0234677 | A1 | 8/2014 | Yoon |
| 2014/0308550 | A1 | 10/2014 | Shimizu et al. |
| 2014/0335378 | A1 | 11/2014 | Kuroda |
| 2015/0064514 | A1 | 3/2015 | Wu et al. |
| 2015/0140369 | A1 | 5/2015 | Itoi et al. |
| 2016/0036088 | A1 | 2/2016 | Tononishi |
| 2016/0133900 | A1 | 5/2016 | Li et al. |
| 2016/0211495 | A1* | 7/2016 | Haynes .................. B32B 9/005 |
| 2016/0254578 | A1* | 9/2016 | Liu .................. H01M 10/6569 429/120 |
| 2016/0301045 | A1 | 10/2016 | Tyler et al. |
| 2016/0301051 | A1 | 10/2016 | Kubota et al. |
| 2017/0084886 | A1 | 3/2017 | Tononishi |
| 2017/0125753 | A1 | 5/2017 | Kim et al. |
| 2017/0301968 | A1* | 10/2017 | Cooney .............. H01M 50/457 |
| 2018/0138478 | A1 | 5/2018 | Chan |
| 2018/0248237 | A1 | 8/2018 | Postler et al. |
| 2019/0259996 | A1 | 8/2019 | Fritz et al. |
| 2021/0288366 | A1* | 9/2021 | Brenner ............ H01M 10/6554 |

FOREIGN PATENT DOCUMENTS

| | | | | |
|---|---|---|---|---|
| CN | 102113166 | A | 6/2011 | |
| CN | 102197531 | A | 9/2011 | |
| CN | 102246330 | A | 11/2011 | |
| CN | 102272981 | A | 12/2011 | |
| CN | 102301503 | A | 12/2011 | |
| CN | 202076374 | U | 12/2011 | |
| CN | 102473884 | A | 5/2012 | |
| CN | 102696131 | A | 9/2012 | |
| CN | 102714289 | A | 10/2012 | |
| CN | 102959761 | A | 3/2013 | |
| CN | 103081164 | A | 5/2013 | |
| CN | 103931020 | A | 7/2014 | |
| CN | 104143666 | A | 11/2014 | |
| CN | 105322122 | A | 2/2016 | |
| CN | 206059541 | U | 3/2017 | |
| CN | 106848130 | A | 6/2017 | |
| CN | 107507937 | A | 12/2017 | |
| CN | 207134404 | U | * | 3/2018 | ............ Y02E 60/10 |
| DE | 10 2008 059 971 | A | 6/2010 | |
| DE | 10 2012 222 876 | A1 | 6/2014 | |
| DE | 10 2013 200 546 | A1 | 7/2014 | |
| DE | 10 2015 212 212 | A1 | 1/2017 | |
| DE | 10 2015 216 029 | A1 | 2/2017 | |
| DE | 10 2015 014 558 | A1 | 5/2017 | |
| DE | 10 2016 100 223 | A1 | 7/2017 | |
| DE | 10 2016 215 131 | B3 | 12/2017 | |
| DE | 10 2016 121 265 | A1 | 5/2018 | |
| EP | 2 077 592 | A1 | 7/2009 | |
| EP | 2 244 318 | A2 | 10/2010 | |
| EP | 2 339 672 | A1 | 6/2011 | |
| EP | 3 300 164 | A1 | 3/2018 | |
| JP | 2005-35845 | A | 2/2005 | |
| JP | 2008-262733 | A | 10/2008 | |
| JP | 2010-55957 | A | 3/2010 | |
| JP | 2010-205509 | A | 9/2010 | |
| JP | 2012-113896 | A | 6/2012 | |
| JP | 2013-168355 | A | 8/2013 | |
| JP | 2015-103346 | A | 6/2015 | |
| JP | 2016-96129 | A | 5/2016 | |
| KR | 10-2014-0104741 | A | 8/2014 | |
| WO | WO 2013/110406 | A1 | 8/2013 | |

OTHER PUBLICATIONS

Machine translation of specification of CN207134404U (Year: 2017).*

Machine translation of specification of CN107507937A (Year: 2017).*

International Search Report (PCT/ISA/210) issued in PCT Application No. PCT/EP2019/061260 dated Jul. 1, 2019 with English translation (four (4) pages).

German-language Written Opinion (PCT/ISA/237) issued in PCT Application No. PCT/EP2019/061260 dated Jul. 1, 2019 (four (4) pages).

German-language Office Action issued in German Application No. 10 2018 210 152.3 dated Apr. 12, 2019 (three (3) pages).

International Search Report (PCT/ISA/210) issued in PCT Application No. PCT/EP2019/064909 dated Oct. 2, 2019 with English translation (four (4) pages).

German-language Written Opinion (PCT/ISA/237) issued in PCT Application No. PCT/EP2019/064909 dated Oct. 2, 2019 (five (5) pages).

German-language Office Action issued in German Application No. 10 2018 210 151.5 dated Nov. 4, 2019 (four (4) pages).

Chinese-language Office Action issued in Chinese Application No. 201980027225.7 dated May 18, 2022 with English translation (19 pages).

Korean-language Office Action issued in Korean Application No. 10-2020-7030342 dated May 19, 2022 with English translation (13 pages).

Japanese-language Office Action issued in Japanese Application No. 2020-552276 dated Mar. 22, 2022 with English translation (10 pages).

Korean-language Office Action issued in Korean Application No. 10-2020-7030341 dated Apr. 20, 2022 with English translation (13 pages).

Chinese-language Office Action issued in Chinese Application No. 201980026925.4 dated May 7, 2022 with English translation (21 pages).

(56) References Cited

OTHER PUBLICATIONS

U.S. Office Action issued in U.S. Appl. No. 17/052,260 dated Mar. 22, 2023 (24 pages).
German-language Office Action issued in European Application No. 19723717.5 dated Feb. 6, 2023 (six (6) pages).
German-language Office Action issued in German Application No. 10 2018 210 152.3 dated Feb. 15, 2023 (eight (8) pages).
Chinese-language Office Action issued in Chinese Application No. 201980026925.4 dated Mar. 14, 2023 with English translation (23 pages).
English translation of previously cited document B13 (JP 2010-205509 A filed on Aug. 5, 2022) (11 pages).
U.S. Final Office Action issued in U.S. Appl. No. 17/052,260 dated May 30, 2023 (14 pages).
U.S. Non-Final Office Action issued in U.S. Appl. No. 17/052,260 dated Aug. 21, 2023 (14 pages).
English translation of document B38 (DE 10 2016 100 223, submitted on Mar. 30, 2023).

\* cited by examiner

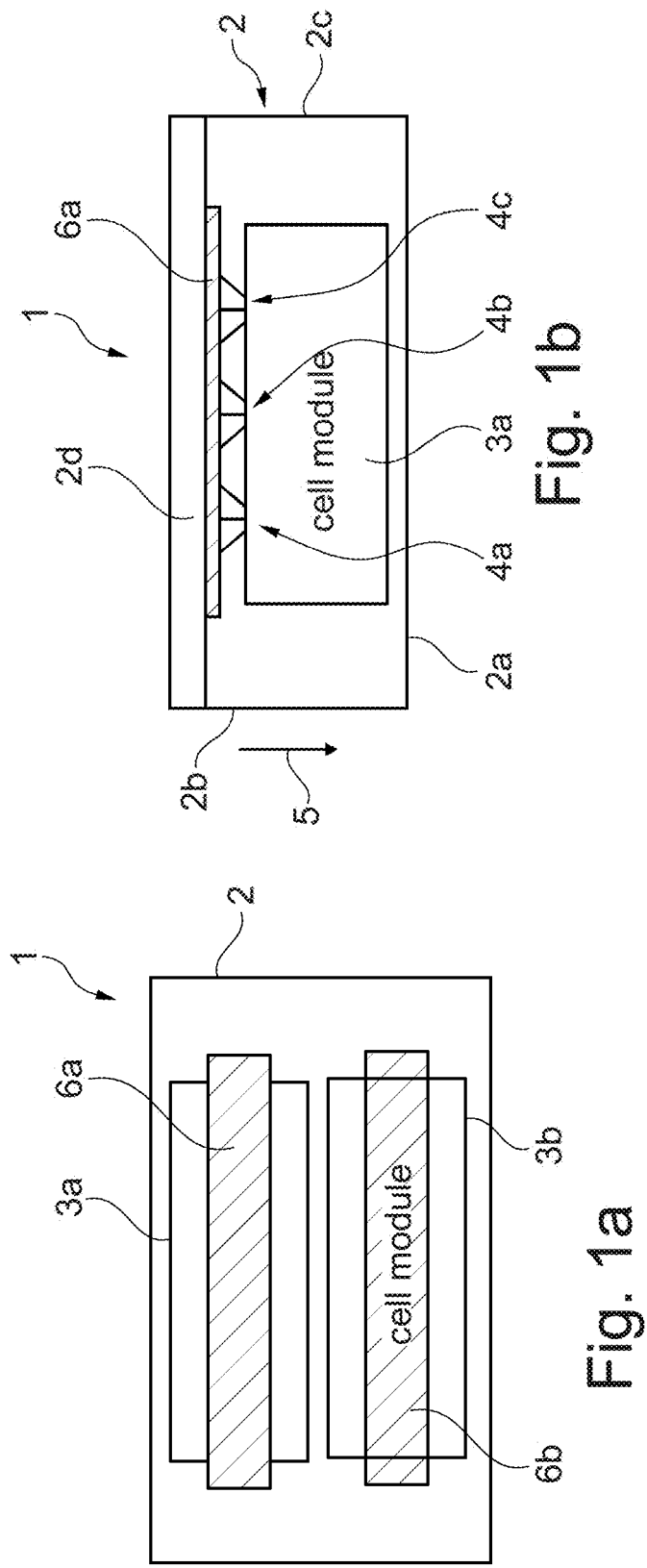

VEHICLE WITH A HIGH-VOLTAGE BATTERY

BACKGROUND AND SUMMARY OF THE INVENTION

The present invention relates to a vehicle having a high-voltage battery.

High-voltage batteries of electric or hybrid vehicles, such as for example the "BMW i3" vehicle, include a high-voltage battery housing having a plurality of what are known as "cell modules" arranged therein. Each of the cell modules consists of a plurality of battery cells arranged consecutively in series and that are electrically connected to one another. The housing in which the individual battery cells are arranged in the BMW i3 is a relatively rigid aluminum housing that is closed off "upwardly", that is to say in the direction toward the passenger compartment, by a screwed-on cover.

The individual battery cells of the BMW i3 each have a substantially cuboidal battery cell housing. If the battery cells are in a correct state, the battery cell housing is liquidtight and gastight, that is to say nothing is able to escape to the outside from the interior of the battery cell housing.

If, for example in the event of an extremely severe accident, battery cells are damaged and/or a short circuit takes place in or between individual battery cells and the interior of a battery cell heats up to an impermissibly great extent, "emergency ventilation" has to be possible for the affected battery cells. To this end, battery cell housings usually have an emergency ventilation (degassing) opening, which may be designed for example as an intended breaking point, which opens when a predefined internal cell pressure is exceeded and allows gas to escape to the outside from the interior of the battery cell. In extreme cases, such as for example in the case of massive damage to individual battery cells, in highly unfavorable constellations the leaking gas may ignite, wherein a leak into the surroundings or into the passenger compartment of the vehicle is very reliably avoided by virtue of the battery cells additionally being surrounded by the housing of the high-voltage battery.

The object of the invention is to provide a vehicle having a high-voltage battery that offers even greater safety with regard to possible fire hazards in comparison with vehicles having conventional high-voltage batteries.

This object is achieved by the features of the independent claim. Advantageous refinements and developments of the invention may be derived from the dependent claims.

The starting point of the invention is the observation that, in the event of extreme mechanical damage to individual battery cells and/or short circuits internal to a cell, very hot, burning gas should be able to leak from the interior of individual battery cells into the interior of the high-voltage battery housing via the emergency ventilation openings of the battery cell housings.

The basic principle of the invention is that of designing the high-voltage battery housing to be locally more thermally resistant at least in those regions in which the emergency ventilation openings of the battery cells are arranged. Although the entire high-voltage battery housing could in principle be designed to be fire-resistant overall, for example by selecting a correspondingly fire-resistant material, such as for example steel, and sufficiently great wall thicknesses, this is not absolutely necessary for safety reasons and would also be linked to a high weight of the high-voltage battery housing. The invention accordingly aims to reinforce the housing of the high-voltage battery (only) in those regions that are particularly greatly thermally loaded in an extreme case, that is to say in the case of what is known as a "thermal event".

The starting point of the invention is a vehicle having a high-voltage battery that has a housing and at least one battery cell arranged in the housing. Instead of one battery cell, a plurality or a multiplicity of battery cells may of course obviously be arranged in the housing, these being able to be connected to one another in "batches" to form what are known as "cell modules".

The at least one battery cell arranged in the housing of the high-voltage battery has an emergency ventilation opening that opens starting from a predefined internal cell pressure through which hot or burning gas is able to escape from the interior of the battery cell housing into the housing of the high-voltage battery in the event of a fault with or damage to the battery cell. The emergency ventilation opening of the battery cell housing faces a wall of the housing of the high-voltage battery against which hot or burning gas flows (directly) in the event of a fault with or damage to the battery cell.

As already mentioned above, the core concept of the invention is that the wall of the high-voltage battery, in the region in which the emergency ventilation opening is arranged and hot or burning gas flows out of the battery cell housing in the event of a fault with or damage to the battery cell, is designed to be locally more thermally resistant than in regions of the wall that are at a distance therefrom.

The wall of the housing of the high-voltage battery is thus just locally thermally reinforced or designed to be locally more thermally resistant. "Locally" in this connection means in that region or in those regions in which hot or burning gas leaking from the interior of the battery cell housing or housings impinges directly on the wall of the housing of the high-voltage battery, similar to the case of a burning jet of gas from a welding torch.

The wall of the housing of the high-voltage battery may consist entirely or in part for example of aluminum or of an aluminum sheet that is designed to be locally more thermally resistant in the region in which the at least one emergency ventilation opening is arranged and hot or burning gas flows out of the battery cell housing in the event of a fault with or damage to the battery cell.

As an alternative thereto, the wall of the housing of the high-voltage battery may also consist entirely or at least in part of a plastic material (or a fiber-reinforced plastic material) that is designed to be locally more thermally resistant in the region in which the at least one emergency ventilation opening is arranged and hot or burning gas flows out of the battery cell housing in the event of a fault with or damage to the battery cell.

As already mentioned above, there may be provision for the interior of the battery cell to be closed off in a gastight manner by the emergency ventilation opening in a correct state of the at least one battery cell. The emergency ventilation opening may be formed for example by an intended breaking point provided in the battery cell housing that is opened or "pushed open" or burst open only when a predefined pressure in the interior of the battery cell housing is exceeded.

The entire housing of the high-voltage battery may in principle be provided with an additional thermally resistant layer. One concept of the invention is that the wall of the high-voltage battery, in the region of the at least one emergency ventilation opening, has at least one thermally resistant layer more, that is to say at least one additional thermally resistant layer, than in regions of the wall that are at a distance therefrom.

By way of example, there may be provision for the one thermally resistant layer or the plurality of thermally resistant layers that locally thermally reinforces or reinforce the wall of the high-voltage battery housing to have an overall layer thickness of at least 0.1 mm.

In order to locally reinforce the wall of the housing of the high-voltage battery, there may for example be provision for the wall to be coated with a thermally resistant coating layer in the region of the at least one emergency ventilation opening. "Thermally resistant" in this connection means that a coating layer is used that is thermally resistant at least up to a predefined minimum temperature of for example 1000° C. or 1100° C. or 1200° C. or 1300° C. Activation of the coating by the heat arising from the emergency ventilation may in this case be used as a positive effect. The coating therefore does not for example have to be burned in when it is applied to the housing (specifically in the case of ceramic coatings), but rather is only coated on. Sufficiently high adhesion for normal operation is achieved through the normal drying of the coating. This is then activated/burned by the heat from the emergency ventilation and may thus achieve its full "thermal resistance". The coating layer may thus be an intumescent layer ("intumescent"). Intumescent materials increase in volume and decrease in density under the effect of heat. There may be provision for the layer to "carbonize" under the effect of heat, and to swell in the process and thus have a thermally insulating effect.

As an alternative or in addition thereto, there may be provision for the wall of the housing of the high-voltage battery to have at least one thermally resistant layer that contains layered silicates or mica and/or mineral fibers or glass fibers and/or ceramic in the region of the at least one emergency ventilation opening. A layer or sheet that is known on the market under the term "mica" layer or "mica" sheet may be used for example as layer containing layered silicates or mica.

The at least one thermally resistant layer may be adhesively bonded, screwed, riveted or connected in another way to the wall of the housing of the high-voltage battery. The thermally resistant layer may be applied directly to the wall of the high-voltage battery housing or be arranged a certain distance of a few mm away from the wall of the high-voltage battery housing by way of spacer elements. If the thermally resistant layer is adhesively bonded to the wall of the housing of the high-voltage battery, an adhesive that is thermally resistant at least up to a temperature of at least 600° C. and does not burn up to a temperature of 1200° Celsius is preferably used.

As an alternative or in addition thereto, there may be provision for the at least one thermally resistant layer to be fully or partly injection-molded and/or encapsulated with material of which the wall consists (for example aluminum, die-cast aluminum, plastic, etc.).

According to one development of the invention, there is provision for the at least one battery cell arranged inside the housing of the high-voltage battery to be arranged such that the emergency ventilation opening of the at least one battery cell is assigned to an upper wall, with respect to the direction of gravity, or to a cover of the high-voltage battery.

There may furthermore be provision for the wall of the housing of the high-voltage battery to be designed to be more thermally resistant on its side facing the emergency ventilation opening, that is to say on an inside of the housing, than in regions of the wall that are at a distance therefrom. The "local thermal reinforcement" is thus preferably applied on the inside of the wall of the high-voltage battery. This is not however absolutely necessary. The wall of the high-voltage battery could in principle also be locally thermally reinforced on its side facing away from the inside of the high-voltage battery housing, that is to say on the outside of the wall of the high-voltage battery housing.

As already mentioned above, a plurality or a multiplicity of battery cells that each have an emergency ventilation opening are preferably arranged in the housing of the high-voltage battery. All of the battery cells are preferably arranged such that their respective emergency ventilation openings face the same wall of the housing (for example the housing cover). There may accordingly be provision for the wall to be designed to be more thermally resistant in the region of all of the emergency ventilation openings than in regions of the inner wall of the housing of the high-voltage battery that are at a distance therefrom.

By way of example, there may be provision for the at least one thermally resistant layer with which the wall of the housing of the high-voltage battery is locally thermally reinforced to consist of a material that does not melt or burn at least up to a temperature of 1000° C. or 1100° C. or 1200° C. or 1300° C.

There may furthermore be provision for the region of the wall that is designed to be more thermally resistant to withstand a temperature of up to 2000° C., in particular a temperature of up to 1600° C., at least for a duration of 0.5 minutes without being perforated or melting.

The at least one thermally resistant layer may in particular be what is known as an SMC layer (sheet-molded compound), that is to say a layer formed of a plurality of individual layers. One or more of these layers may be for example glass fiber-reinforced and/or mineral fiber-reinforced plastic layers.

The invention is explained in more detail below in connection with the drawings.

BRIEF DESCRIPTION OF THE DRAWINGS

FIG. 1a is a plan view of a high-voltage battery housing according to an embodiment of the invention in a schematic illustration.

FIG. 1b is a cross section through a high-voltage battery housing according to an embodiment of the invention in a schematic illustration.

FIG. 1c is part of a wall of a high-voltage battery housing that is locally reinforced by a thermally resistant layer.

DETAILED DESCRIPTION OF THE DRAWINGS

FIG. 1a shows a schematic illustration of a plan view of a high-voltage battery 1 that has a housing 2. Two cell modules 3a, 3b are arranged in the housing of the high-voltage battery 1. Each of the two cell modules 3a, 3b consists of a plurality of individual battery cells arranged consecutively (not illustrated individually) that are electrically connected to one another. Each of the battery cells has a battery cell housing.

On upper sides (oriented out of the plane of the drawing) of the battery cell housings, the individual battery cell housings each have an emergency ventilation (degassing) opening 4a, 4b, 4c (cf. FIG. 1b). If the battery cells are in the correct state, the emergency ventilation openings are closed off, that is to say the battery cell housings are then gastight, meaning that nothing, neither liquids nor gases, may escape from the interior of the battery cell housings.

In the event of a fault with or in the event of damage to individual battery cells, short circuits internal to a cell, an increase in the internal cell pressure and the escape of combustible or burning gases from the interior of individual battery cells into the interior of the housing 2 of the high-voltage battery 1 may occur.

If leaking gases ignite, very high temperatures may occur in particular in the region of the emergency ventilation openings 4a, 4b, 4c, that is to say in those regions in which burning gases escape from the battery cells, similarly to the case of a burning jet of gas from a welding machine.

In order to avoid endangering people even in such extreme scenarios, it is important for the housing 2 of the high-voltage battery 1 to be sufficiently thermally resistant. In the event of the leakage of burning gases from individual battery cells, the greatest thermal loading occurs in the region or in the immediate vicinity of the emergency ventilation openings. Even a few centimeters away from the emergency ventilation openings, the thermal loading is already significantly lower.

FIG. 1b illustrates the direction of gravity using an arrow 5. The housing 2 of the high-voltage battery 1 has a base 2a, side walls 2b, 2c and a cover 2d arranged on an upper side of the housing 2. A thermally resistant layer 6a, 6b is arranged on an inside of the cover 2d.

As is apparent from FIG. 1a, the thermally resistant layers 6a, 6b do not extend over the entire surface or inside of the cover 2d, but rather only over those regions in which the emergency ventilation openings 4a, 4b, 4c of the battery cells, not illustrated in more detail here, are arranged.

The thermally resistant layers 6a, 6b are thus provided only where they are actually needed, that is to say where the greatest thermal loading occurs in the case of a thermal event. Regions of the cover 2d or of the side walls 2b, 2c or of the base 2a of the housing that are further away do not have any such additional thermally resistant layer. The thermally resistant layers 6a, 6b are thus arranged only locally in the regions that are most thermally loaded in the event of an accident or the like. The thermally resistant layers may be for example layers consisting of layered silicates or mica and/or mineral fibers or glass fibers and/or ceramic and/or a correspondingly thermally resistant coating. The thermally resistant layers 6a, 6b may in turn be formed of a plurality of individual layers.

FIG. 1c shows an exemplary embodiment in which a thermally resistant layer 6a is arranged on a cover 2d of a housing 2, not illustrated in more detail here, of a high-voltage battery 1. The thermally resistant layer 6a has a plurality of through-openings, only a single through-opening 7 being illustrated here. Material of the cover 2d extends in the manner of a plug and thus in a form-fitting manner through the through-opening 7. A plug 2d' of the cover material cantilevers the through-hole 7 in a form-fitting manner, as a result of which the thermally resistant layer 6a is connected to the cover 2d in a form-fitting manner. The cover 2d may for example consist of a metal, such as for example aluminum or an aluminum cast material or else of a plastic material that is reinforced for example by embedded fibers (for example glass fibers).

The thermally resistant layer may thus be partly or fully injection-molded or encapsulated with material of the cover 2d. As an alternative thereto, the thermally resistant layer 6a may also be adhesively bonded, screwed, riveted or connected in another way to the cover 2d.

What is claimed is:

1. A vehicle having a high-voltage battery, comprising:
a housing; and
at least one battery cell arranged in the housing, wherein
the at least one battery cell has a battery cell housing with an emergency ventilation opening which opens at a predefined internal cell pressure and through which gas is able to escape from an interior of the battery cell housing into the housing of the high-voltage battery in an event of at least one of a fault with or damage to the battery cell,
the emergency ventilation opening faces a wall of the housing against which the gas flows in the event of the at least one of the fault with or the damage to the battery cell,
the wall of the housing of the high-voltage battery is locally more thermally resistant in a region in which the emergency ventilation opening is arranged and the gas flows out of the battery cell housing in the event of the at least one of the fault with or the damage to the battery cell than in regions of the wall that are at a distance therefrom,
the wall is coated with an intumescent layer only in the region in which the emergency ventilation opening is arranged and the gas flows out of the battery cell housing in the event of the at least one of the fault with or the damage to the battery cell,
the wall has at least one thermally resistant layer that contains at least one of:
layered silicates or mica,
mineral fibers or glass fibers, or
ceramic,
the at least one thermally resistant layer is arranged only in the region in which the emergency ventilation opening is arranged and the gas flows out of the battery cell housing in the event of the at least one of the fault with or the damage to the battery cell, such that the gas impinges directly on the at least one thermally resistant layer, and
the at least one thermally resistant layer is partly or fully injection-molded and/or encapsulated with material of which the wall is made.

2. The vehicle according to claim 1, wherein
the wall is made of aluminum sheet metal that is locally more thermally resistant in the region in which the emergency ventilation opening is arranged and the gas flows out of the battery cell housing in the event of the at least one of the fault with or the damage to the battery cell.

3. The vehicle according to claim 1, wherein
the wall is made of a plastic material that is locally more thermally resistant in the region in which the emergency ventilation opening is arranged and the gas flows out of the battery cell housing in the event of the at least one of the fault with or the damage to the battery cell.

4. The vehicle according to claim 1, wherein
the emergency ventilation opening is closed off in a gastight manner in a normal state of the battery cell.

5. The vehicle according to claim 1, wherein
the emergency ventilation opening is formed by an intended breaking point that opens when the predefined internal cell pressure is exceeded.

6. The vehicle according to claim 1, wherein
the at least one thermally resistant layer has a total thickness of at least 0.1 mm.

7. The vehicle according to claim 6, wherein the at least one thermally resistant layer is adhesively bonded to the wall.

8. The vehicle according to claim 6, wherein the at least one thermally resistant layer is screwed and/or riveted to the wall.

9. The vehicle according to claim 1, wherein the at least one battery cell is arranged such that the emergency ventilation opening faces an upper wall, with respect to a direction of gravity, or a cover of the high-voltage battery.

10. The vehicle according to claim 1, wherein the wall is more thermally resistant on a side facing the emergency ventilation opening that is an inside of the housing than in regions of the wall that are at a distance therefrom.

11. The vehicle according to claim 1, wherein a plurality of battery cells whose housings each have an emergency ventilation opening are arranged in the housing of the high-voltage battery.

12. The vehicle according to claim 11, wherein all of the plurality of battery cells are arranged such that their respective emergency ventilation openings face the same wall of the housing.

13. The vehicle according to claim 11, wherein the wall is more thermally resistant in the region of all of the emergency ventilation openings than in regions of the wall of the housing that are at a distance therefrom.

14. The vehicle according to claim 6, wherein the at least one thermally resistant layer is made of a material that does not melt and does not burn at least up to a temperature of 1300° C.

15. The vehicle according to claim 1, wherein the region of the wall that is more thermally resistant is able to withstand a temperature of up to 2000° C. at least for a duration of 0.5 minutes without being perforated or burned.

* * * * *